(12) United States Patent
Costa

(10) Patent No.: US 7,441,622 B2
(45) Date of Patent: Oct. 28, 2008

(54) SPRINGER TYPE SUSPENSION

(76) Inventor: Vincenzo F. Costa, 15572 Computer La., Huntington Beach, CA (US) 92649

( * ) Notice: Subject to any disclaimer, the term of this patent is extended or adjusted under 35 U.S.C. 154(b) by 461 days.

(21) Appl. No.: 11/250,354

(22) Filed: Oct. 15, 2005

(65) Prior Publication Data

US 2006/0279063 A1    Dec. 14, 2006

Related U.S. Application Data

(63) Continuation-in-part of application No. 11/138,811, filed on May 26, 2005.

(51) Int. Cl.
*B62K 1/00* (2006.01)
(52) U.S. Cl. .................. 180/219; 280/276; 280/279
(58) Field of Classification Search ............... 280/276, 280/277, 279, 275, 283; 188/24.22, 24.21
See application file for complete search history.

(56) References Cited

U.S. PATENT DOCUMENTS

| | | | | | |
|---|---|---|---|---|---|
| 3,876,318 | A | * | 4/1975 | Crispell | 403/290 |
| 4,775,163 | A | * | 10/1988 | McGowan et al. | 280/277 |
| 4,969,374 | A | * | 11/1990 | Borromeo | 74/551.1 |
| 5,026,083 | A | * | 6/1991 | Wendorf | 280/277 |
| 5,096,327 | A | * | 3/1992 | Ruland | 403/290 |
| 5,186,274 | A | * | 2/1993 | Hegman | 180/227 |
| 5,855,388 | A | * | 1/1999 | Brewer | 280/288.4 |
| 6,164,675 | A | * | 12/2000 | Pickering | 280/277 |
| 6,260,869 | B1 | * | 7/2001 | Hanlon et al. | 280/276 |
| 6,457,732 | B2 | * | 10/2002 | Ito et al. | 280/277 |
| 6,457,775 | B2 | * | 10/2002 | Timon | 297/344.11 |
| 6,485,043 | B2 | * | 11/2002 | Ito et al. | 280/276 |
| 6,488,300 | B2 | * | 12/2002 | Ito et al. | 280/276 |
| 6,976,691 | B1 | * | 12/2005 | Song et al. | 280/279 |
| 7,121,568 | B2 | * | 10/2006 | Law | 280/280 |

* cited by examiner

*Primary Examiner*—Tony H. Winner
(74) *Attorney, Agent, or Firm*—Clement Cheng

(57) ABSTRACT

A motorcycle springer type suspension has an upper fork tree and a stanchion tube having an upper end that fits within the upper fork tree. The upper end of the stanchion tube is hidden within the upper fork tree. A retainer clamp has a push rod tube having an upper end that fits within the retainer clamp. The upper end of the push rod tube is hidden within the retainer clamp.

5 Claims, 3 Drawing Sheets

SPRINGER TYPE SUSPENSION

This application is a CIP of Ser. No. 11/138,811 filed May 26, 2005.

DISCUSSION OF RELATED ART

Typically, a motorcycle front suspension has a pair of fork legs having springs and shocks mounted internally. A springer type suspension provides a steering suspension with a fixed pair of fork legs formed as a stanchion tubes pivotally mounted with a rocker arm that provides support in connection with one or more push rods.

The rocker angle is adjusted by adjusting the spring push rod and stanchion rod length. The trail in a springer is adjusted with the rocker position. Changing the rocker angle can tune the bike to any desired trail. The trail affects stability during motorcycle operation. Thus, a springer type suspension provides an additional degree of freedom when adjusting the trail.

BRIEF DESCRIPTION OF THE DRAWINGS

FIG. 8 is an assembly diagram drawn in perspective.

DETAILED DESCRIPTION OF THE PREFERRED EMBODIMENT

Figure 1:
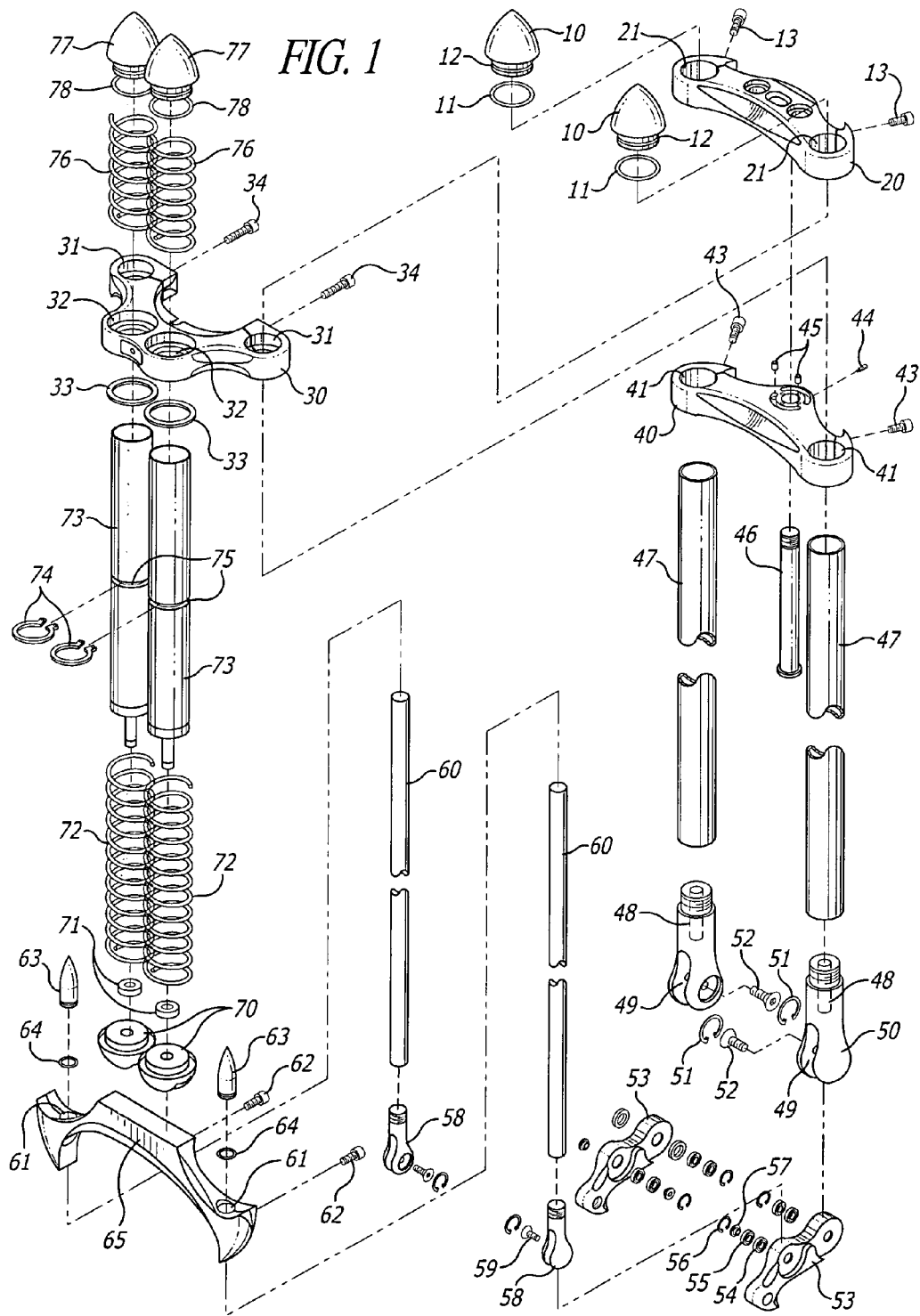
FIG. 1 is an exploded view of the device.

Referring to figure one of the preferred embodiment, the exploded view shows an upper fork tree, or clamp 20 having a pair of apertures 21 receiving the upper end of a stanchion tube 47 that is cut at an upper end. Stanchion means a upright pole, tube, post, or support. The tube 47 can be cut rough such as with a hacksaw by hand and inserted into the aperture 21 and capped with a stanchion tube caps 10 that have a cylindrical connection 12 and seal rings 11. The upper fork tree 20 receives a pair of pinch bolts 13 retaining the stanchion tube 47. The stanchion tube 47 passes through the middle fork tree 30 through an aperture in the middle fork tree 31 held by a middle fork tree pinch bolt 34. The stanchion tube 47 passes then through the lower fork tree 40 at the lower fork tree aperture 41 where the stanchion tube 47 is held by pinch bolt 43. The bottom portion of the stanchion tube is attached to a pivot connector 50 having a slot 49 connecting to rocker arm 53. A bolt 52 and clip 51 maintain the pivot connection with the rocker arm 53. A hollow passage 48 drilled into the pivot connector 50 provides an opening at a top and of pivot connector 50 that passes to the upper portion of slot 49. The rocker arm 53 has a plurality of fittings including a clip 56, a bearing 55 and possibly a second bearing 54. The rocker arm 53 has three axle connections.

The rear axle connection receives the slot 49. The middle axle connection receives the push rod connector 58. The lower and foremost axle connection receives the front wheel of the motorcycle. The push rod connector 58 is bolted by bolt 59 to the middle axle connection of the rocker arm 53. The push rod connector 58 is formed similarly to the connector 50 as both have a slot allowing pivotal movement. The push rods 60 connect at a lower end to the push rod connector 58 and at an upper end to the retainer 65. The retainer is formed as a clamp having a pair of apertures 61 retaining the push rods. The push rods 60 can be cut with a rough hand saw such as a hacksaw. The upper rough end is hidden under the push rod cap 63 and sealed with a seal ring 64. The aperture clamps 61 retain the push rod during normal vehicle operation by virtue of a pair of bolts 62. The retainer 65 should be appropriately ornamented to provide a bitchn' badass look. The upper surface of the retainer receives the lower compression springs 72 that are mounted on lower spring caps 70. The springs 72 are mounted with compression against the middle fork tree and around the dampening pistons 73. The dampening pistons have one or more circlips 74 mounted on circlip grooves 75. The pistons have circular washers 71 interfacing between the piston and lower spring caps 70.

Circlip washers 33 are optional and retain the pistons 73 and compression Springs 72. The circlip washers 33 fit into the middle fork tree 30 in the circlip openings 32. The pistons are mounted free. The upper springs 76 fit around the upper portion of the piston 73 providing an alternative to elastomeric bushings. The upper springs 76 push against the upper spring caps 77 that are sealed into the piston tube 73 by upper spring cap seals 78. The upper springs 76 push against the upper spring caps and resist buckling rotation by providing buckling restoration bias. Therefore, the upper springs 76 can also be called buckling restoration bias springs because they restore the piston tube 73 to a vertical position as seen in the first figure. Obviously, the mounting of the front suspension to the motorcycle typically has a rocker angle so that the front suspension is not mounted vertically, but rather at an angle to the ground. Therefore, what is vertical in figure one is later defined as the axis of rotation of the front suspension. The front suspension rotation revolves about a portion of the frame 46 that is mounted and secured in part by setscrews 45. The portion of the frame 46 is mounted between the upper 20 and lower 40 fork tree. The fork tree is also known as the clamp.

Figure 2:
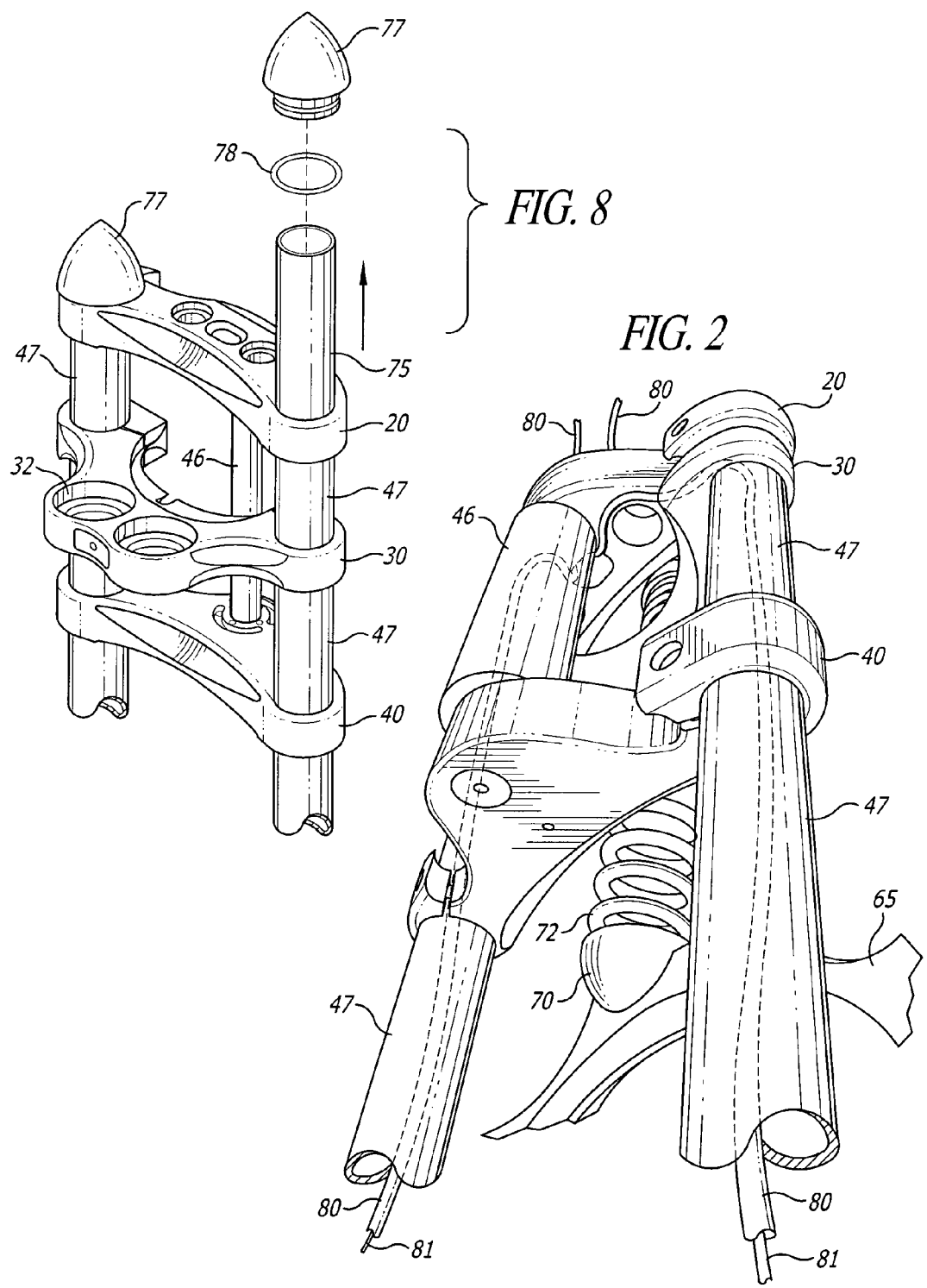
FIG. 2 is a perspective view.

FIG. 2 shows the perspective view of the device with a hidden brake line sheathing 80 around brake line 81. The hidden brake line begins at the upper end of the device and starts at the upper fork tree 20 passing through brake line channels 90 and down the stanchion tube 47 passing through the lower fork tree 40 and through aperture 48 through slot 49 before reaching the brake device.

Figure 3:
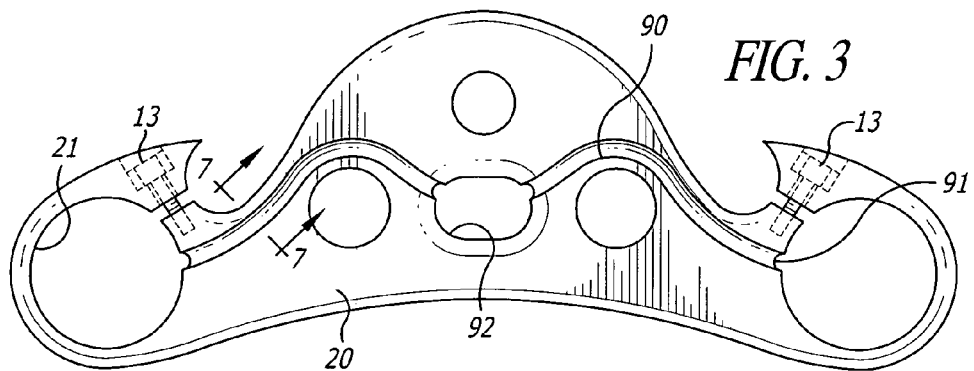
FIG. 3 is a bottom view of the upper clamp.
Figure 4:
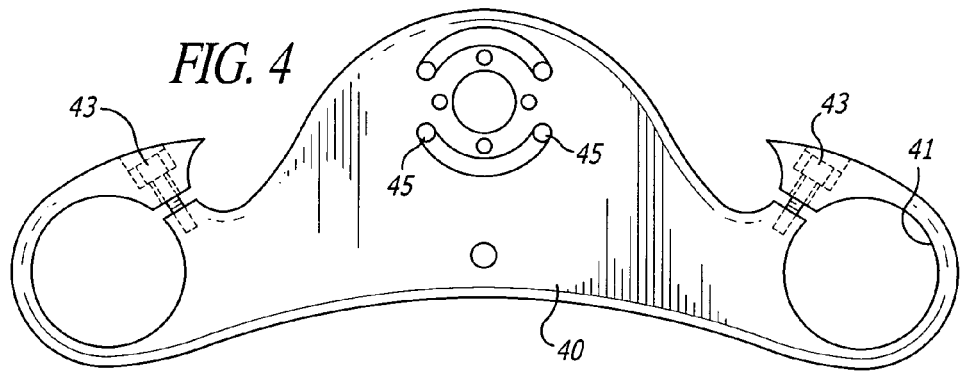
FIG. 4 is a top view of the lower clamp.
Figure 5:
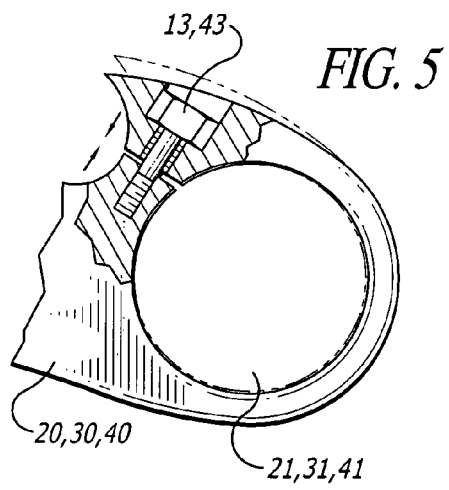
FIG. 5 is a cross section of the pinch bolt operation.
Figure 6:
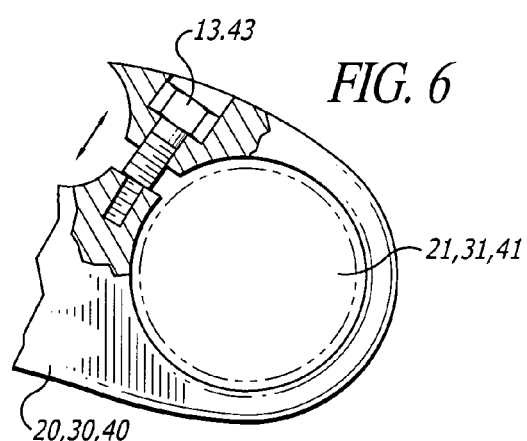
FIG. 6 is a cross section of the spreader bolt operation.
Figure 7:
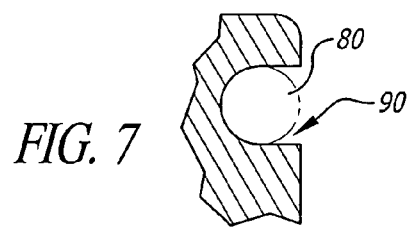
FIG. 7 is a cross section of the brake line of shown in FIG. 3.

FIG. 3 shows the brake line passage formed from a central aperture 92 receiving the brake line from the top of the top fork tree 20, and providing a passage to the top of the stanchion tube 47. A notch 91 is optional and provides easier passage. The brake line thus passes between the central aperture 92 and the upper fork tree stanchion aperture 21. As seen in FIG. 4, the lower fork tree 40 has lower fork tree stanchion aperture 41 and a pair of setscrews 45. As seen in FIG. 5, a pinch bolt 13, 43 provides compression about the stanchion aperture 21, 31, 41 on the upper 20, middle 30, lower 40 fork tree. As seen in FIG. 5, a spreader bolt 13, 43 provides extension about the stanchion aperture 21, 31, 41 on the upper 20, middle 30, lower 40 fork tree during installation. The forks have fork pinch threads and spreader bolt threads.

Figure eight provides a perspective view of the assembly of the stanchion tube 47. The protruding portion 75 can be measured and then cut off with a rough hand saw to receive the cap 77 sealed by a ring seal 78. The stanchion tube passes through the upper fork tree 20, the middle fork tree 30 and the lower fork tree 40 where it is rigidly affixed by a plurality of bolts clamping the fork trees to the tube 47.

The invention claimed is:

1. A fork assembly comprising: an upper fork tree; a stanchion tube having an upper end that fits within the upper fork tree, wherein the upper end of the stanchion tube is hidden within the upper fork tree; a rocker arm pivotally connected to a bottom end of the stanchion tube; and a hidden brake line passing through the top fork tree down the stanchion tube wherein the hidden brake line exits though a pivot slot brake line exit hole.

2. A fork assembly comprising: a retainer clamp; a push rod tube having an upper end that fits within a retainer clamp, wherein the upper end of the push rod tube is hidden within the retainer clamp: a rocker arm pivotally connected to a bottom end of the push rod tube; and a hidden brake line passing through the top fork tree down the stanchion tube, wherein the hidden brake line exits though a pivot slot brake line exit hole.

3. A fork assembly comprising: a retainer clamp; a push rod tube having an upper end that fits within a retainer clamp, wherein the upper end of the push rod tube is hidden within the retainer clamp; a rocker arm pivotally connected to a bottom end of the push rod tube; and a circlip providing adjustable length to a piston.

4. A fork assembly comprising:
  a. an upper fork tree;
  b. a stanchion tube having an upper end that fits within the upper fork tree, wherein the upper end of the stanchion tube is hidden within the upper fork tree;
  c. a lower fork tree;
  d. a retainer clamp;
  e. a rocker in pivot connection with the stanchion tube and push rod tube;
  f. a hidden brake line passing through the top fork tree down the stanchion tube; and a push rod tube having an upper end that fits within a retainer clamp, wherein the upper end of the push rod tube is hidden within the retainer clamp, wherein the hidden brake line exits though a pivot slot brake line exit hole.

5. A fork assembly comprising:
  a. an upper fork tree;
  b. a stanchion tube having an upper end that fits within the upper fork tree, wherein the upper end of the stanchion tube is hidden within the upper fork tree;
  c. a lower fork tree;
  d. a retainer clamp;

a push rod tube having an upper end that fits within a retainer clamp, wherein the upper end of the push rod tube is hidden within the retainer clamp a rocker in pivot connection with the stanchion tube and push rod tube further comprising buckling restoration bias springs wherein the fork is free of elastomeric bushings, further comprising a circlip providing adjustable length to a piston.

* * * * *